(12) United States Patent
Schlothauer et al.

(10) Patent No.: US 11,248,484 B2
(45) Date of Patent: Feb. 15, 2022

(54) GAS TURBINE COMPONENT

(71) Applicant: MTU Aero Engines AG, Munich (DE)

(72) Inventors: Steffen Schlothauer, Erdweg (DE); Thomas Hess, Munich (DE); Christian Liebl, Bockhorn (DE); Richard Scharl, Karlsfeld (DE); Daniel Kirchner, Munich (DE); Alexander Buck, Munich (DE)

(73) Assignee: MTU Aero Engines AG, Munich (DE)

( * ) Notice: Subject to any disclaimer, the term of this patent is extended or adjusted under 35 U.S.C. 154(b) by 797 days.

(21) Appl. No.: 15/016,033

(22) Filed: Feb. 4, 2016

(65) Prior Publication Data

US 2016/0230582 A1 Aug. 11, 2016

(30) Foreign Application Priority Data

Feb. 5, 2015 (DE) .......................... 102015202070.3

(51) Int. Cl.
| | |
|---|---|
| *F01D 11/12* | (2006.01) |
| *F01D 11/08* | (2006.01) |
| *F01D 5/12* | (2006.01) |
| *B33Y 10/00* | (2015.01) |
| *B33Y 80/00* | (2015.01) |

(52) U.S. Cl.
CPC .............. *F01D 11/122* (2013.01); *F01D 5/12* (2013.01); *F01D 11/08* (2013.01); *F01D 11/12* (2013.01); *F01D 11/127* (2013.01); *B33Y 10/00* (2014.12); *B33Y 80/00* (2014.12); *F05D 2220/32* (2013.01); *F05D 2230/10* (2013.01); *F05D 2230/30* (2013.01); *F05D 2230/31* (2013.01); *Y02T 50/60* (2013.01)

(58) Field of Classification Search
CPC .......... F01D 11/122; F01D 5/12; F01D 11/08; F01D 11/12; F01D 11/127; B33Y 10/00; B33Y 80/00; F05D 2220/32; F05D 2230/10; F05D 2230/30; F05D 2230/31; Y02T 50/671
USPC ....................................... 415/173.4
See application file for complete search history.

(56) References Cited

U.S. PATENT DOCUMENTS

| | | | | |
|---|---|---|---|---|
| 4,218,066 A | * | 8/1980 | Ackermann | ............ F01D 11/02 277/414 |
| 4,639,388 A | * | 1/1987 | Ainsworth | .............. B32B 15/04 428/117 |
| 5,662,757 A | * | 9/1997 | Langenbrunner | ....... F01D 11/12 156/298 |

(Continued)

FOREIGN PATENT DOCUMENTS

| | | |
|---|---|---|
| DE | 102008025511 A1 | 12/2009 |
| DE | 102009037620 A1 | 2/2011 |

(Continued)

*Primary Examiner* — Woody A Lee, Jr.
*Assistant Examiner* — Brian Christopher Delrue
(74) *Attorney, Agent, or Firm* — Davidson, Davidson & Kappel, LLC

(57) ABSTRACT

A gas turbine component for a gas turbine is provided. The gas turbine component has a shell portion having an abradable portion (2) to allow rotor blade ends (1) of a rotor blade array of the gas turbine to rub into the same. The abradable portion adjoins a neighboring portion (3) of the shell portion axially at both sides and is additively manufactured together therewith.

20 Claims, 2 Drawing Sheets

(56) References Cited

U.S. PATENT DOCUMENTS

| | | | |
|---|---|---|---|
| 5,683,789 A * | 11/1997 | Langenbrunner | F01D 11/12 252/511 |
| 6,652,227 B2 * | 11/2003 | Fried | F01D 11/122 415/173.4 |
| 8,662,827 B2 | 3/2014 | Schuetz et al. | |
| 9,598,973 B2 * | 3/2017 | Ghasripoor | F16J 15/445 |
| 9,644,489 B1 * | 5/2017 | Tham | B33Y 10/00 |
| 9,840,919 B2 | 12/2017 | Bayer et al. | |
| 2003/0054196 A1 * | 3/2003 | Lau | C23C 4/02 428/655 |
| 2003/0138658 A1 * | 7/2003 | Taylor | C03C 17/3411 428/632 |
| 2005/0220612 A1 * | 10/2005 | Jahns | F01D 9/04 415/179 |
| 2009/0304497 A1 | 12/2009 | Meier et al. | |
| 2012/0141253 A1 | 6/2012 | Weidmann | |
| 2013/0189085 A1 | 7/2013 | Werner et al. | |
| 2013/0236293 A1 * | 9/2013 | Adaickalasamy | F01D 9/04 415/139 |
| 2014/0147242 A1 | 5/2014 | Ghasripoor et al. | |
| 2014/0199163 A1 * | 7/2014 | Lee | C23C 28/04 415/174.4 |
| 2014/0321998 A1 | 10/2014 | Maar et al. | |
| 2015/0048553 A1 * | 2/2015 | Dietrich | B22F 3/1055 264/401 |
| 2015/0239010 A1 * | 8/2015 | Cheung | C23C 24/04 427/189 |
| 2016/0146034 A1 * | 5/2016 | Schuster | F01D 11/125 415/173.4 |
| 2016/0369636 A1 * | 12/2016 | Hitchman | F01D 11/122 |
| 2017/0089213 A1 * | 3/2017 | Stevens | F01D 11/001 |

FOREIGN PATENT DOCUMENTS

| | | | |
|---|---|---|---|
| DE | 102010019958 | | 11/2011 |
| DE | 102010054113 | | 6/2012 |
| DE | 102011086775 A1 | | 1/2013 |
| DE | 102012200883 A1 | | 7/2013 |
| DE | 102013205883 A1 | | 10/2014 |
| DE | 102013207452 | | 11/2014 |
| EP | 2444515 | | 4/2012 |
| WO | WO 2007/085230 A1 | | 8/2007 |
| WO | WO2012/122373 | | 9/2012 |
| WO | WO2013029584 | | 3/2013 |
| WO | WO 2015173312 A1 * | 11/2015 | F01D 5/286 |

* cited by examiner

GAS TURBINE COMPONENT

This claims the benefit of German Patent Application DE102015202070.3, filed Feb. 5, 2016 and hereby incorporated by reference herein.

The present invention relates to a gas turbine component for a gas turbine, a gas turbine, in particular an aircraft gas turbine, including the casing part, and to methods for manufacturing and repairing the gas turbine component.

BACKGROUND

It is known from in-house practice to attach honeycomb-like abradable liners for rotor blade ends to a gas turbine component by brazing or gluing, or by thermal spraying.

SUMMARY OF THE INVENTION

It is an object of an embodiment of the present invention to improve the manufacture, operation and/or repair of gas turbines.

The present invention provides a gas turbine component for a gas turbine, in particular a gas turbine component of a gas turbine, has a shell portion which, in an embodiment, at least partially circumferentially surrounds a rotor blade array of the gas turbine, in particular encompasses it over 360° or houses it, or is intended and adapted for this purpose.

In one embodiment, the gas turbine is an aircraft gas turbine. In one embodiment, the rotor blade array is a rotor blade array of a compressor or turbine stage of the gas turbine. In one embodiment, the rotor blade array has a plurality of rotor blades arranged adjacent one another in the circumferential direction and having radially outer rotor blade ends. In one embodiment, the rotor blade ends may have a shroud. The rotor blades may also be shroudless. In one embodiment, the rotor blade ends each have one or more sealing fins extending radially toward the shell portion.

In one embodiment, the shell portion, which houses, or is intended and adapted to house, the rotor blade array of the gas turbine, is a single piece. This makes it possible, in particular, to increase the strength and/or reduce its weight. In another embodiment, the shell portion, which houses, or is intended and adapted to house, the rotor blade array of the gas turbine, is of multi-piece construction, in particular, is segmented in the circumferential direction. This makes it possible, in particular, to facilitate the manufacture and/or the assembly/disassembly. Thus, a single such segment can also be a shell portion in accordance with the present invention.

In one embodiment, the gas turbine component is permanently or detachably connected to a casing part of the gas turbine, or is intended and adapted for this purpose. The gas turbine component may in particular be a single-piece or multi-piece seal carrier which is permanently or detachably connected to a casing part of the gas turbine. In another embodiment, the gas turbine component is formed integrally (i.e. in one piece) with the casing part of the gas turbine. Accordingly, in one embodiment, the gas turbine component is a casing part of the gas turbine. In one embodiment, the casing component and/or the shell portion defines or bounds a flow duct of the gas turbine in which is rotatably mounted the rotor blade array.

In accordance with an aspect of the present invention, the shell portion has an abradable portion to allow rotor blade ends of the rotor blade array to rub into the same, the abradable portion adjoining a neighboring portion of the shell portion axially at both sides and being additively manufactured together therewith.

This makes it possible to provide the abradable portion in an advantageous manner, in particular with little effort. Additionally or alternatively, an abradable portion manufactured together with its neighboring area may advantageously have a higher reliability and/or a longer life.

In one embodiment, the abradable portion is, or is intended and adapted to be, such that the rotor blade ends rub, in particular non-destructively, into the abradable liner during operation, in particular during initial operation, or at a particular, especially extreme, operating point or condition, so as to create a most accurate fit, in particular radial seal. In other words, in one embodiment, the abradable portion is designed to exhibit a rubbed-in state during normal operation.

In one embodiment, the abradable portion has a lower surface hardness than the neighboring portion. In a refinement, an, in particular maximum or average, hardness of the surface of the abradable portion that faces the rotor blade array, in particular a Rockwell hardness HR, especially HRA, HRB or HRC, a Brinell hardness HB, or a Vickers hardness HV, is no greater than 90%, particularly no greater than 75%, of a corresponding, in particular maximum or average, hardness of the surface of the neighboring portion that faces the rotor blade array, in particular a Rockwell hardness HR, especially HRA, HRB or HRC, a Brinell hardness HB, or a Vickers hardness HV. This makes it possible to improve the rubbing-in of the rotor blade ends.

In one embodiment, additionally or alternatively, the abradable portion has a lower density than the neighboring portion. In a refinement, an, in particular maximum or average, density of the abradable portion is no greater than 90%, particularly no greater than 75%, of an, in particular maximum or average, density of the neighboring portion. This makes it possible to additionally or alternatively improve the rubbing-in of the rotor blade ends.

In one embodiment, the abradable portion and the neighboring portion are additively manufactured together by locally solidifying, in particular powdery or liquid, material layer-by-layer, in particular optically, thermally and/or chemically, thereby bonding it to an underlying layer.

In one embodiment, a lower hardness and/or density, in particular, may be obtained by providing that the porous abradable portion have a larger maximum, minimum and/or average pore size than the neighboring portion. In a refinement, the abradable portion may be free of pores; i.e., may have maximum, minimum and average pore size of 0 mm.

In one embodiment, a surface of the abradable portion that faces the rotor blade array at least predominantly has closed pores, which may be advantageous, particularly for fluidic reasons. In another embodiment, a surface of the abradable portion that faces the rotor blade array at least predominantly has open pores, which may be advantageous, particularly for manufacturing reasons.

In a refinement, the pores are distributed irregularly and/or have different sizes. Accordingly, in one embodiment, the abradable portion is additively manufactured so as to be sponge-like, together with the not sponge-like, but solid neighboring portion. This may be advantageous, particularly for the rubbing-in process.

In a further refinement, the pores are distributed regularly and/or at least predominantly have the same size. This may be advantageous, particularly for manufacturing purposes. An irregular or regular distribution and/or identical or different pore sizes may be produced by correspondingly locally solidifying the material during the additive manufacturing process.

Additionally or alternatively to a (more) porous abradable portion, the abradable portion may contain a different material than the neighboring portion, in particular to obtain a lower hardness and/or density. To this end, in one embodiment, the abradable portion and the neighboring portion are additively manufactured together by placing different materials in the abradable portion and the neighboring portion layer-by-layer and locally solidifying the materials, thereby bonding them to an underlying layer.

In one embodiment, a radial offset between surfaces of the abradable portion and the axially adjacent neighboring portion that face the rotor blade array is no greater than 5 mm, particularly no greater than 2 mm, and more particularly no greater than 1 mm. This may be advantageous, particularly for fluidic reasons.

In one embodiment, an, in particular maximum, minimum and/or average, radial wall thickness of the abradable portion away from its surface that faces the rotor blade array is at least 1 mm, particularly at least 2 mm, and more particularly at least 5 mm. In one embodiment, additionally or alternatively, an, in particular maximum, minimum and/or average, radial wall thickness of the abradable portion away from its surface that faces the rotor blade array is no greater than 20 mm, particularly no greater than 15 mm, and more particularly no greater than 10 mm. Thus, a sufficiently large and/or compact abradable portion can be provided more advantageously.

In one embodiment, the neighboring portion has one or more axial ribs which, in particular, are distributed in the circumferential direction, in particular equidistantly, and which extend axially into the abradable portion, and more specifically axially through the abradable portion which is segmented by the axial ribs. This advantageously allows the neighboring portion to thereby support the, in particular segmented, abradable portion not only in the axial direction, but also in the circumferential direction.

Additionally or alternatively, the neighboring portion adjoins the abradable portion also radially on the outside. In particular, the neighboring portion may radially surround or encompass the abradable portion.

In one embodiment, the abradable portion projects axially beyond the rotor blade ends of the rotor blade array on one or both sides by at least 1 mm, particularly at least 2 mm, and/or by no more than 10 mm, particularly no more than 5 mm. In other words, in one embodiment, the abradable portion extends at least 1 mm, particularly at least 2 mm, and/or no more than 10 mm, particularly no more than 5 mm, beyond a leading edge of an airfoil of the rotor blade array or a rotor blade of the rotor blade array in the upstream direction away from the rotor blade array. In one embodiment, additionally or alternatively, the abradable portion extends at least 1 mm, particularly at least 2 mm, and/or no more than 10 mm, particularly no more than 5 mm, beyond a trailing edge of an airfoil of the rotor blade array or a rotor blade of the rotor blade array in the upstream direction away from the rotor blade array. Thus, a sufficiently large and/or compact abradable portion can be provided more advantageously.

In accordance with an aspect of the present invention, a gas turbine component as described herein is repaired by initially removing the rubbed-in abradable portion, in particular by machining, and mounting a separately manufactured abradable liner in the recess so produced. This makes it possible to combine the described advantages of an abradable portion that is additively manufactured together with the neighboring portion and the advantageous repair option provided by separately manufactured abradable liners.

BRIEF DESCRIPTION OF THE DRAWINGS

Further advantageous refinements of the present invention will be apparent from the dependent claims and the following description of preferred embodiments. To this end, the drawings show, partly in schematic form, in:

DETAILED DESCRIPTION

Figure 1:
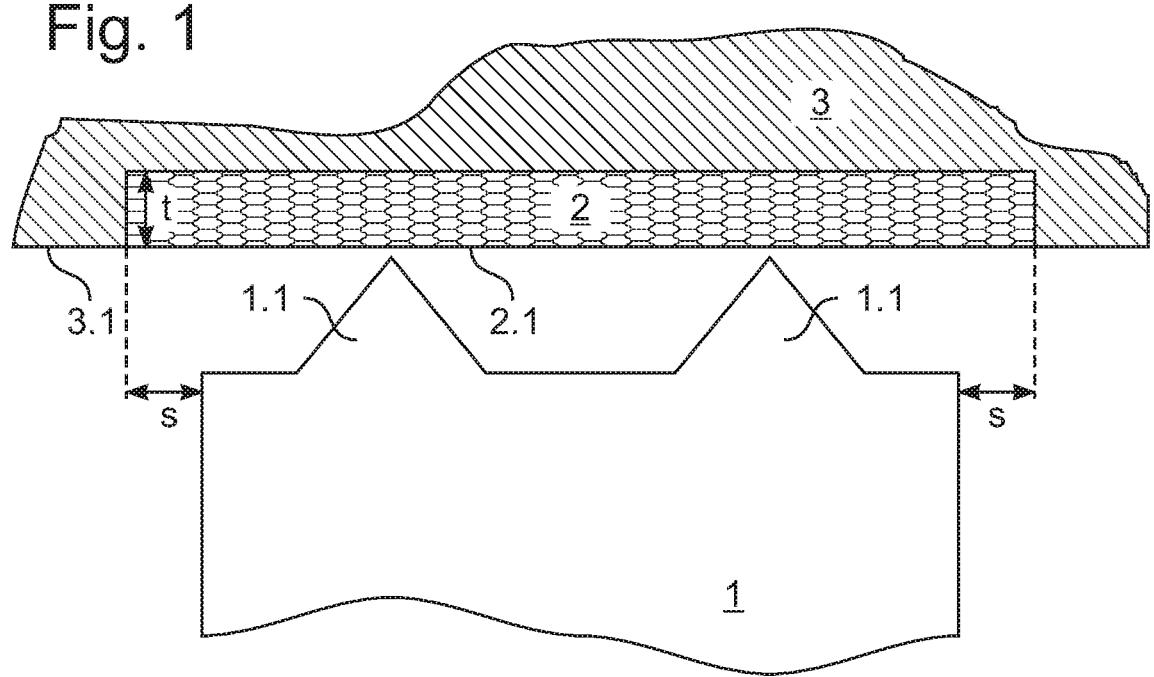
FIG. 1: a portion of a shell portion of a gas turbine component of a gas turbine according to an embodiment of the present invention in a cross section taken along line I-I of FIG. 2.
Figure 2:
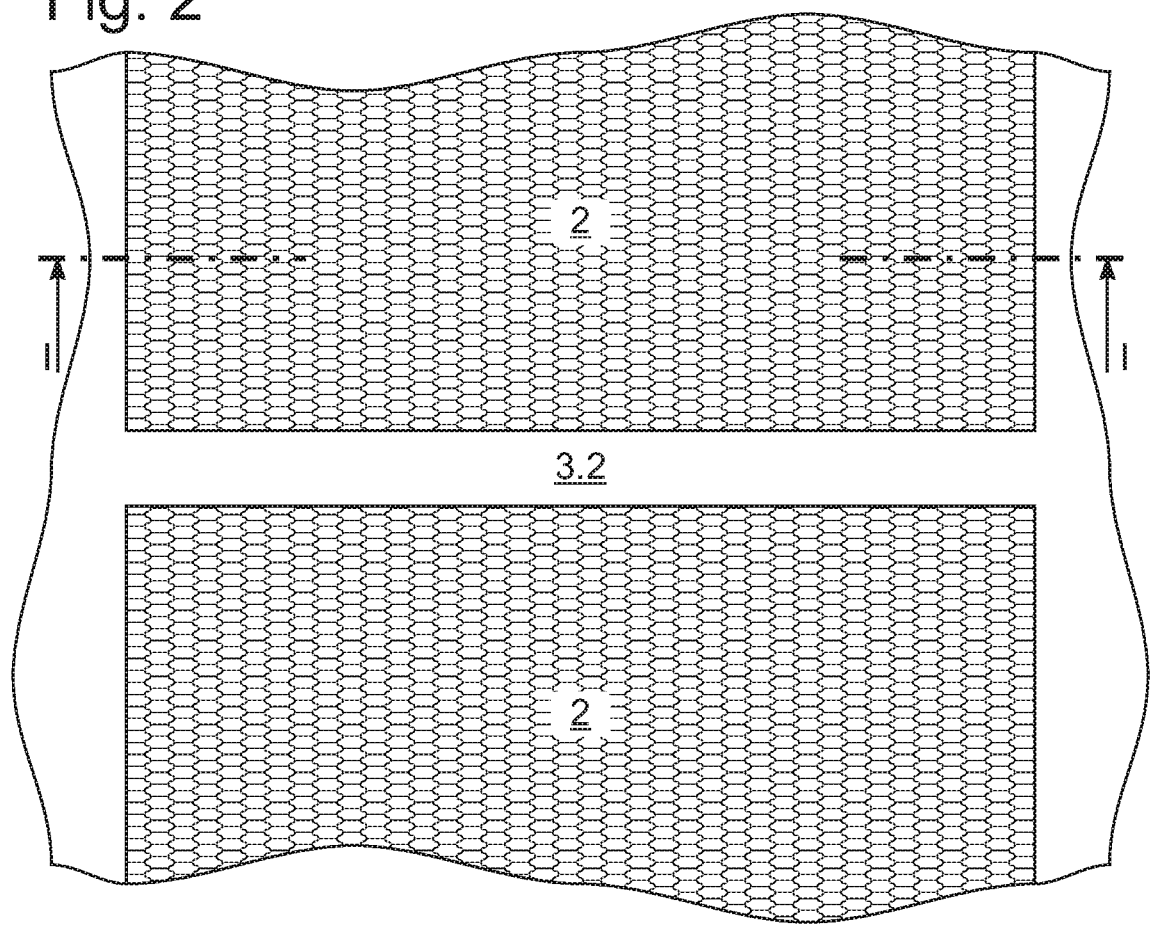
FIG. 2: a developed view of a portion of the shell portion.

FIG. 2 shows in a developed view a portion of a shell portion of a gas turbine component of a gas turbine according to an embodiment of the present invention, and FIG. 1 shows a cross section taken along line I-I of FIG. 2.

The shell portion houses a rotor blade array of the gas turbine, of which FIG. 1 shows a rotor blade end 1 having sealing fins 1.1 extending radially toward the shell portion.

The gas turbine component may in particular be a seal carrier or casing part of the gas turbine.

The shell portion has an abradable portion 2 to allow rotor blade ends 1 of the rotor blade array to rub into the same, the abradable portion adjoining a neighboring portion 3 of the shell portion axially at both sides (to the left and right in FIGS. 1, 2) and being additively manufactured together therewith.

Abradable portion 2 is intended to exhibit a rubbed-in state during normal operation, and has a lower surface hardness and a lower density than neighboring portion 3.

Figure 3:
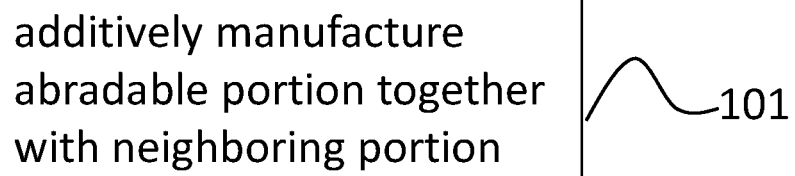
FIG. 3: shows a flowchart of a method for manufacturing the gas turbine component by additively manufacturing the abradable portion together with the neighboring portion.

To this end, abradable portion 2 is additively manufactured so as to be porous or sponge-like, together with solid neighboring portion 3. Additionally or alternatively, abradable portion 2 and neighboring portion 3 are additively manufactured together, as shown in step 101 of FIG. 3, but from different materials, by placing different materials in different regions layer-by-layer and locally solidifying the materials, thereby bonding them to an underlying layer The surfaces 2.1, 3.1 of the abradable portion and the neighboring portion that face the rotor blade array are flush with each other, so that a radial offset therebetween is about 0 mm.

A radial wall thickness t of abradable portion 2 away from its surface 2.1 that faces the rotor blade array is between 5 mm and 10 mm.

Neighboring portion 3 has a plurality of axial ribs 3.2 which are equidistantly distributed in the circumferential direction (vertically in FIG. 2) and extend axially (horizontally in FIGS. 1, 2) through abradable portion 2, which is segmented by axial ribs 3.2. In addition, neighboring portion 3 adjoins abradable portion 2 also radially (vertically in FIG. 1) on the outside, as can be seen in FIG. 1.

Abradable portion 2 projects axially beyond rotor blade ends 1 of the rotor blade array on both sides by a length s between 2 mm and 5 mm.

Figure 4:
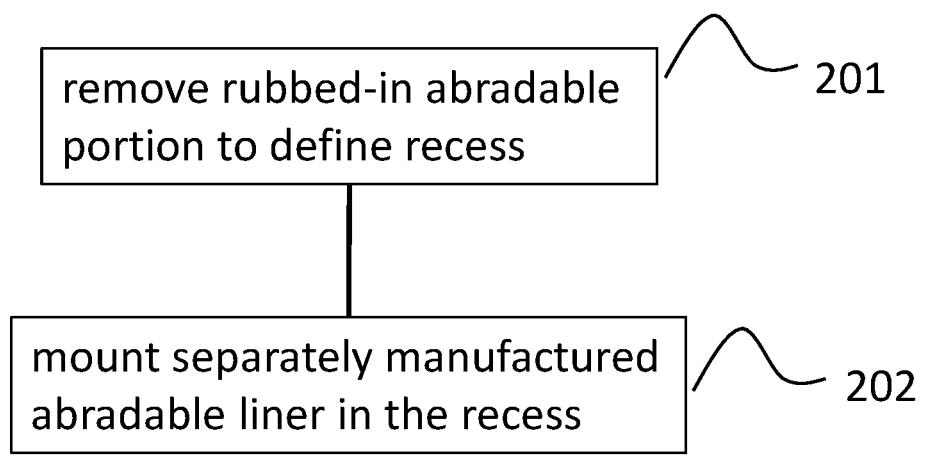
FIG. 4: shows flowchart of a method for repairing the gas turbine component by removing the rubbed-in abradable portion to define a recess; and mounting a separately manufactured abradable liner in the recess.

In order to effect a repair, rubbed-in abradable portion 2 is initially removed by machining as shown in step 201 of FIG. 4, and a separately manufactured abradable liner is mounted in the recess so produced as shown in step 202 of FIG. 4.

Although the above is a description of exemplary embodiments, it should be noted that many modifications are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection set forth in the appended claims and their equivalent combinations of features.

LIST OF REFERENCE NUMERALS 1 rotor blade end (rotor blade array)
2 abradable portion
2.1 surface
3 neighboring portion
3.1 surface
3.2 axial rib
s axial length
t wall thickness

What is claimed is:

1. A gas turbine component for a gas turbine, the gas turbine component comprising:
a shell portion, the shell portion having an abradable portion to allow rotor blade ends of a rotor blade array of the gas turbine to rub into the abradable portion, the abradable portion having two axial sides spaced axially, the abradable portion adjoining a neighboring portion of the shell portion axially at both axial sides, the abradable portion and the neighboring portion being additively manufactured together by locally solidifying both the abradabale portion and the neighboring portion material together in each layer of a layer-by-layer structure, the abradable portion having at least one of the following: a lower surface hardness than the neighboring portion; a lower density than the neighboring portion; the abradable portion being porous, the abradable portion having a larger maximum, minimum or average pore size than the neighboring portion; and the abradable portion and the neighboring portion containing different materials.

2. The gas turbine component as recited in claim 1 wherein the abradable portion has the lower surface hardness than the neighboring portion.

3. The gas turbine component as recited in claim 1 wherein the abradable portion has the lower density than the neighboring portion.

4. The gas turbine component as recited in claim 1 wherein the abradable portion is porous, the abradable portion having the larger maximum, minimum or average pore size than the neighboring portion.

5. The gas turbine as recited in claim 4 wherein the neighboring portion is pore-free.

6. The gas turbine component as recited in claim 1 wherein the abradable portion and the neighboring portion contain the different materials.

7. The gas turbine component as recited in claim 1 wherein a radial offset between surfaces of the abradable portion and the axially adjacent neighboring portion facing the rotor blade array is no greater than 5 mm.

8. The gas turbine component as recited in claim 1 wherein a radial wall thickness of the abradable portion is at least 1 mm or no greater than 20 mm.

9. The gas turbine component as recited in claim 1 wherein the neighboring portion has axial ribs extending axially into the abradable portion.

10. The gas turbine component as recited in claim 9 wherein the neighboring portion has axial ribs extending axially through the abradable portion, the abradable portion being segmented by the axial ribs.

11. The gas turbine component as recited in claim 1 wherein the shell portion is of single-piece or multi-piece construction.

12. A gas turbine comprising:
a casing part having a rotor blade array rotatably disposed therein; and
the gas turbine component as recited in claim 1, the shell portion housing the rotor blade array and being connected to or formed integrally with the casing part.

13. An aircraft gas turbine comprising the gas turbine as recited in claim 12.

14. The gas turbine as recited in claim 12 wherein the abradable portion projects axially beyond the rotor blade ends of the rotor blade array on one or both sides by at least 1 mm or by no more than 10 mm.

15. A method for manufacturing the gas turbine component as recited in claim 1 comprising:
additively manufacturing the abradable portion together with the neighboring portion.

16. A method for repairing the gas turbine component as recited in claim 1 comprising:
removing the rubbed-in abradable portion to define a recess; and
mounting a separately manufactured abradable liner in the recess.

17. The method as recited in claim 16 wherein the removing includes machining.

18. The method as recited in claim 16 wherein the abradable portion and the neighboring portion are additively manufactured optically.

19. The method as recited in claim 16 wherein the material is a powder.

20. The method as recited in claim 16 wherein the material includes different materials for the abradable portion and the neighboring portion.

* * * * *